(12) United States Patent  (10) Patent No.: US 9,400,531 B2
Chu et al.  (45) Date of Patent: Jul. 26, 2016

(54) NOTEBOOK COMPUTER

(71) Applicant: SHENZHEN ARBOO TECHNOLOGY CO., LTD., Baoan, Shenzhen, Guangdong (CN)

(72) Inventors: David Chu, Guangdong (CN); Haihua Zhou, Guangdong (CN)

(73) Assignee: Shenzhen Arboo Technology Co., Ltd., Shenzhen, Guangdong province (CN)

(*) Notice: Subject to any disclaimer, the term of this patent is extended or adjusted under 35 U.S.C. 154(b) by 0 days.

(21) Appl. No.: 14/374,017

(22) PCT Filed: Aug. 19, 2013

(86) PCT No.: PCT/CN2013/081754
§ 371 (c)(1),
(2) Date: Jul. 23, 2014

(87) PCT Pub. No.: WO2014/173048
PCT Pub. Date: Oct. 30, 2014

(65) Prior Publication Data
US 2016/0041587 A1 Feb. 11, 2016

(30) Foreign Application Priority Data
Apr. 26, 2013 (CN) .......................... 2013 1 0149886

(51) Int. Cl.
*H01Q 1/24* (2006.01)
*G06F 1/18* (2006.01)
*G06F 1/16* (2006.01)

(52) U.S. Cl.
CPC .............. *G06F 1/185* (2013.01); *G06F 1/1616* (2013.01); *G06F 1/1637* (2013.01); *G06F 1/1658* (2013.01); *G06F 1/1681* (2013.01); *H01Q 1/244* (2013.01)

(58) Field of Classification Search
CPC ......... G06F 1/183; G06F 1/185; G06F 1/186; G06F 1/1656; G06F 1/1658; H01Q 1/244; H01Q 1/2275
USPC .......................................................... 361/801
See application file for complete search history.

(56) References Cited

U.S. PATENT DOCUMENTS

| | | | | |
|---|---|---|---|---|
| 5,734,551 A * | 3/1998 | Hileman | .................. | G06F 1/184 361/695 |
| 5,822,193 A * | 10/1998 | Summers | .............. | H05K 7/1408 361/740 |
| 5,949,379 A * | 9/1999 | Yang | ........................ | H01Q 1/24 343/702 |
| 6,220,887 B1 * | 4/2001 | Downs | ................ | H01R 12/7005 361/801 |
| 6,259,418 B1 * | 7/2001 | Jones | ...................... | H01Q 1/084 343/702 |
| 6,356,438 B1 * | 3/2002 | Leman | ...................... | G06F 1/20 206/701 |
| 6,424,335 B1 * | 7/2002 | Kim | ...................... | G06F 1/1616 345/158 |
| 6,430,041 B1 * | 8/2002 | Johnson | .................. | G06F 1/181 165/126 |

(Continued)

*Primary Examiner* — Adrian S Wilson
(74) *Attorney, Agent, or Firm* — PROI Intellectual Property US

(57) ABSTRACT

The present invention relates to a notebook computer, comprising a computer main body and a screen movably connected to the computer main body. A cavity and an expansion card press mechanism is provided inside the computer main body. A popup box is further provided on one side of the computer main body. The expansion card press mechanism comprises press blocks capable of moving forward and backward in an installation direction of an expansion card. The press blocks press the expansion card. The cavity is provided with an opening which is disposed at a position on an end face of the computer main body. The popup box is movably connected to the computer main body and provided with an antenna.

17 Claims, 4 Drawing Sheets

(56) References Cited

U.S. PATENT DOCUMENTS

| | | | | |
|---|---|---|---|---|
| 6,556,170 B2* | 4/2003 | Northey | ............... | H01Q 1/084 343/700 MS |
| 7,489,523 B2* | 2/2009 | Hsu | ............... | H05K 7/1487 361/726 |
| 7,787,258 B2* | 8/2010 | Cheney | ............... | H05K 7/1431 312/223.2 |
| 8,072,751 B2* | 12/2011 | Farrow | ............... | G06F 1/183 361/679.6 |
| 2002/0022460 A1* | 2/2002 | Lintern | ............... | H01Q 1/084 455/97 |
| 2002/0163472 A1* | 11/2002 | Kasuya | ............... | G06K 13/0825 343/702 |
| 2003/0210199 A1* | 11/2003 | Sward | ............... | H01Q 1/10 343/795 |
| 2004/0263398 A1* | 12/2004 | Cheng | ............... | H01Q 1/084 343/702 |
| 2005/0270735 A1* | 12/2005 | Chen | ............... | G06F 1/1632 361/679.55 |
| 2009/0143119 A1* | 6/2009 | De Vos | ............... | H01Q 1/084 455/575.7 |
| 2009/0257182 A1* | 10/2009 | Yang | ............... | G03B 29/00 361/679.27 |

* cited by examiner

NOTEBOOK COMPUTER

FIELD OF THE INVENTION

The present invention relates to the field of computers, and particularly to a notebook computer.

BACKGROUND OF THE INVENTION

Antennas of the existing notebook computers are built-in the computers. Because a computer casing will not obstruct antennas, the operation of the antennas will be not affected. However, for waterproof, dustproof and shockproof notebook computers, high air-tightness and barrier property are required; as a result, antennas built-in the computers will be obstructed, thereby affecting the reception performance of the antennas and the normal operation of the computers. With the increasing requirements on performance, a plurality of expansion cards, such as video cards and memory banks, will be disposed in a computer. For portable computers, as the computers will be moved or transported due to job demands, and certain shock will be generated during the movement or transportation, the expansion cards will become loose or even fall off. In this case, the next time of use of the computers will be affected, and it is inconvenient for work. There is no extra available space for the existing computers, so it is difficult to additionally provide other auxiliary hardware, such as hard disks or expansion interfaces.

SUMMARY OF THE INVENTION

To solve the problems in the prior art, the present invention provides a special computer with an expansion card press mechanism, an antenna popup box and an expansion space.

The present invention provides a notebook computer, including a computer main body and a screen movably connected to the computer main body, an expansion card press mechanism and a cavity being provided inside the computer main body, a popup box being further provided on one side of the computer main body, the expansion card press mechanism including press blocks capable of moving forward and backward in an installation direction of an expansion card, the press blocks being pressed on the expansion card, the cavity being provided with an opening which is disposed at a position one an end face of the computer main body, the popup box being movably connected to the computer main body and provided with an antenna.

As a further improvement of the present invention, the expansion card press mechanism further includes a support plate which is mounted on the computer main body, the press blocks being mounted on the support plate and being capable of moving on the support plate, the support plate being provided with a fixation mechanism connected to a computer fixation plate.

As a further improvement of the present invention, strip-shaped slide grooves are provided on the press blocks, threaded holes being provided on the support plate, the slide grooves being corresponding to the positions of the threaded holes, and fastening bolts passing through the slide grooves and then being fixed inside the threaded holes.

As a further improvement of the present invention, the press blocks are provided with cushion blocks pressing the expansion card in the installation direction of the expansion card, the support plate being of a step structure having at least two steps, the surface of each step being provided with a press block.

As a further improvement of the present invention, the computer main body is further provided with a popup device and a slide mechanism, the popup device being capable of sliding inside the slide mechanism, the slide mechanism including a first slide groove and a second slide groove, the popup box being provided with a first slider and a second slider, the first slider being mounted inside the first slide groove, the second slider being mounted inside the second slide groove, the popup device including a popup mechanism and a switch engagement mechanism in cooperation with the popup mechanism, the switch engagement mechanism controlling the popup mechanism to pop the popup box up.

As a further improvement of the present invention, the popup mechanism includes a first spring, one end of which is mounted at a lower end of the popup box while the other end thereof is mounted inside the computer main body, the spring being in a compressed state when the popup box is closed.

As a further improvement of the present invention, the switch engagement mechanism includes a second spring, a buckle, a start key and a neck, the start key being mounted on the second slide groove, the second spring being mounted between the start key and the second slide groove, the start key being capable of compressing the second spring and capable of being bounced by the second spring, the neck being disposed on the second slider, the buckle being buckled inside the neck, the buckle being separate from the neck to pop the popup box up when the start key is pressed down.

As a further improvement of the present invention, the neck includes a first neck and a second neck, the buckle being buckled in the first neck when the popup box is closed, the buckle being buckled in the second neck when the popup box is opened.

As a further improvement of the present invention, the computer main body is further provided with a damper and a rack, the damper being mounted on the second slide groove, the rack being mounted on the popup box, the damper being provided with a gear in cooperation with the rack.

As a further improvement of the present invention, the cavity is provided therein with a terminal interface connected to the mainboard, and the notebook computer further includes a cover fitted with the opening of the cavity.

The present invention has the following beneficial effects: the press blocks press the expansion card to make the expansion card more firmly and not get loose; the popup box is provided with an antenna and can be popped up, so that signal reception and transmission of the notebook computer may be ensured; in addition, new hardware, connected to a mainboard, may be added inside the cavity, so the application of a computer is expanded, and it is convenient for users to use.

DETAILED DESCRIPTION OF THE PREFERRED EMBODIMENTS

Reference numbers in the figures: 1—Computer main body; 2—Screen; 31—Press block; 32—Support plate; 33—Cushion block; 34—Expansion card; 35—Computer fixation plate; 36—Fastening bolt; 37—Fixation bolt; 38—Bolt hole; 311—Slide groove; 331—Groove; 41—Computer main body; 42—Popup box; 411—First slide groove; 412—Second slide groove; 421—Second slider; 4211—First neck; 4212—Second neck; 431—First spring; 442—Start key; 443—Buckle; 444—Second spring; 451—Damper; 452—Rack; 53—Cavity; 54—Mainboard; 521—Hard disk; 522—Battery; 518—Spindle; and, 541—Interface.

Figure 1:
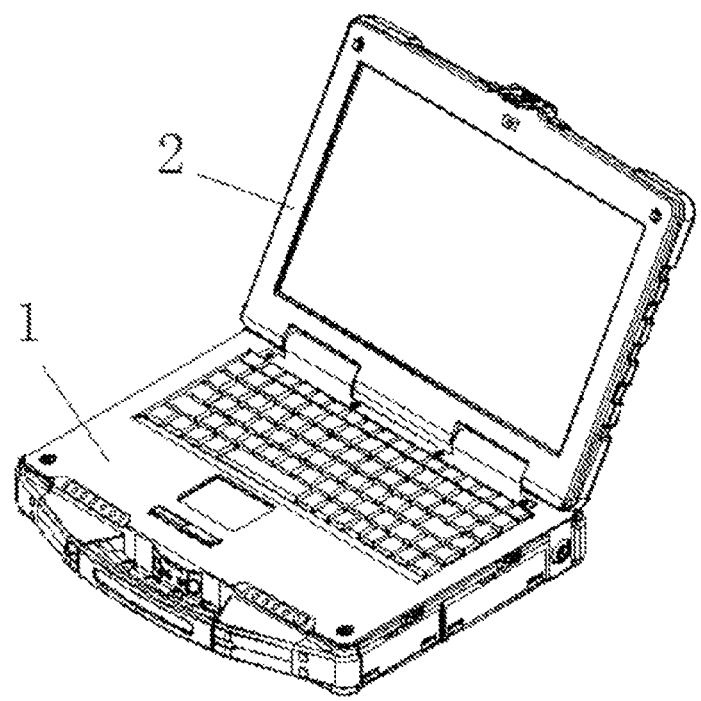
FIG. 1 is an overall structural diagram of a notebook computer according to the present invention.
Figure 2:
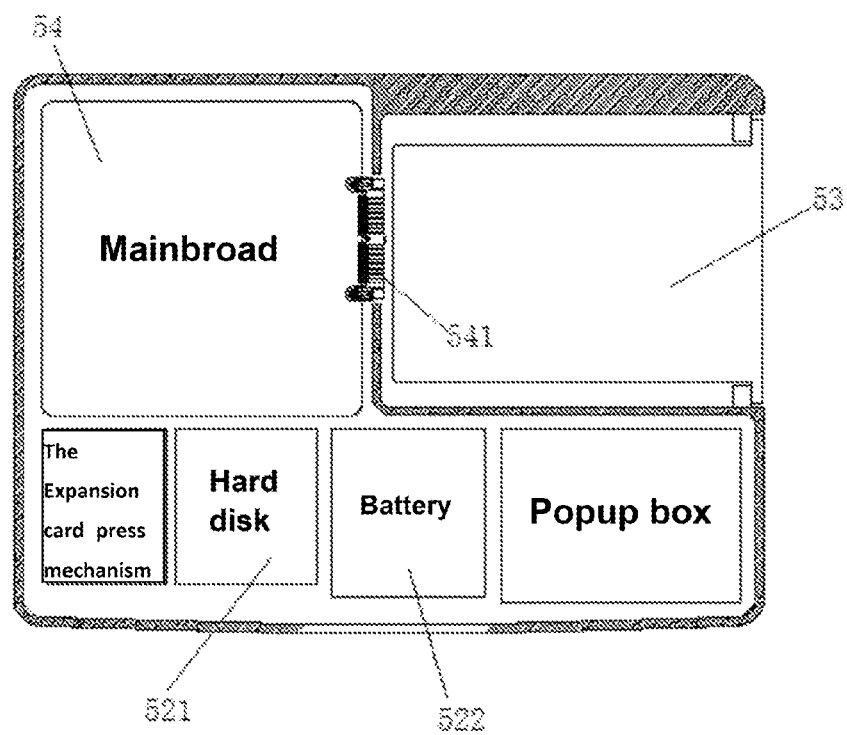
FIG. 2 is a structural block diagram of the notebook computer according to the present invention.
Figure 3:
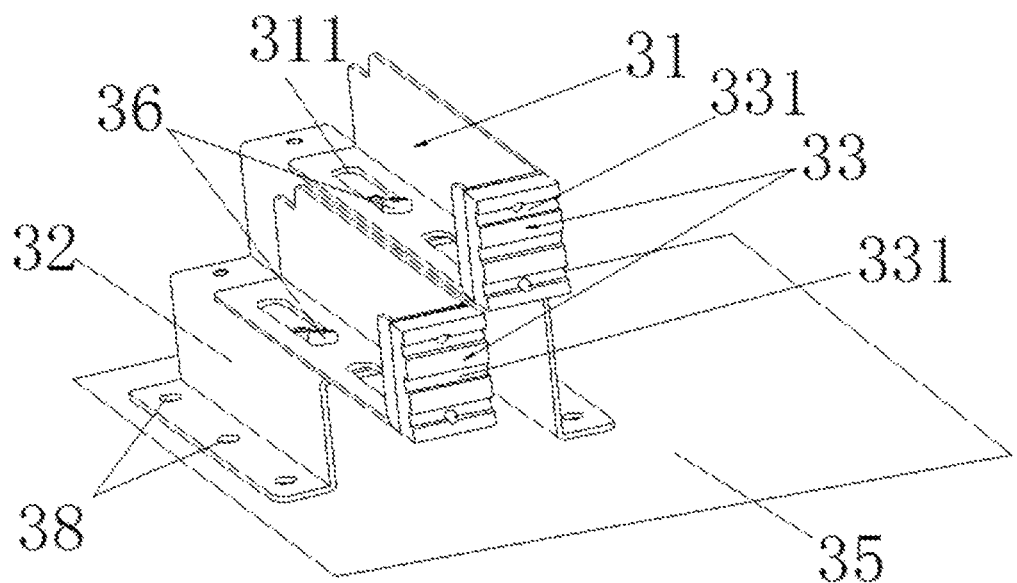
FIG. 3 is a structural diagram of an expansion card press mechanism of the notebook computer according to the present invention.
Figure 4:
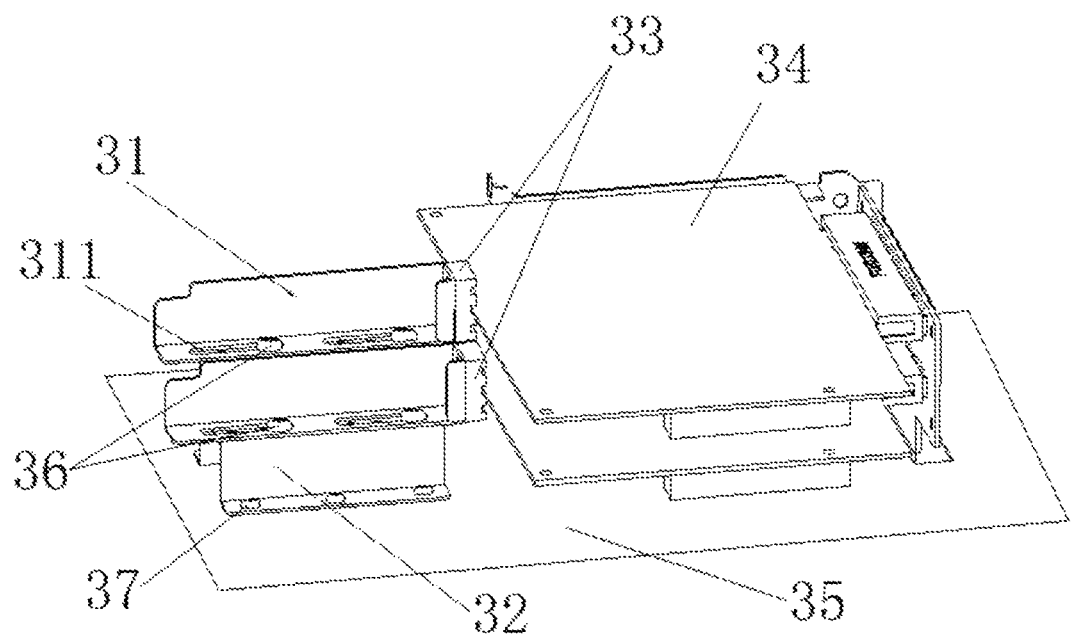
FIG. 4 is a structural diagram of the expansion card press mechanism of the notebook computer according to the present invention, when in the working state.
Figure 5:
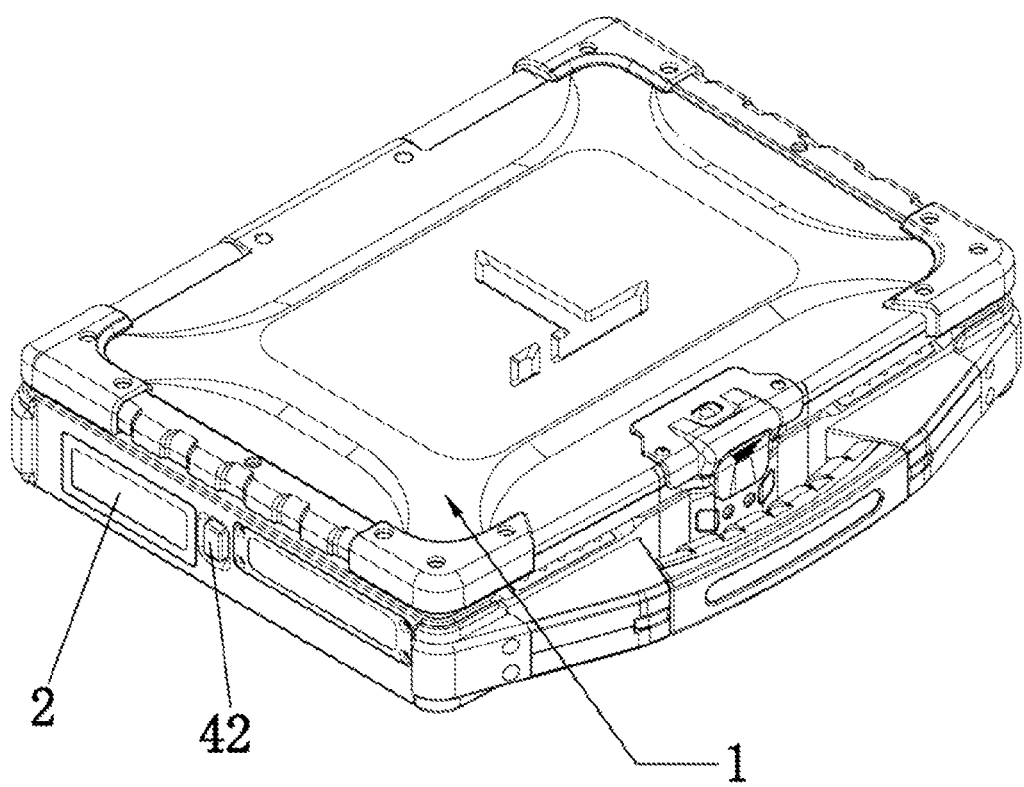
FIG. 5 is a schematic diagram of an installation site of a popup box of the notebook computer according to the present invention.
Figure 6:
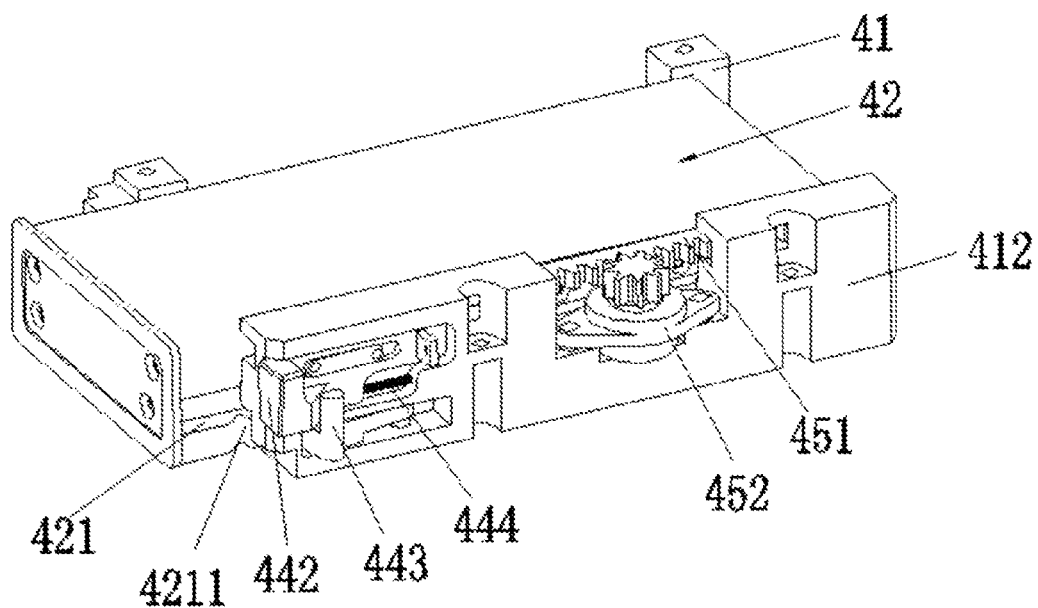
FIG. 6 is an overall structural diagram of a popup box of the notebook computer according to the present invention, when installed.
Figure 7:
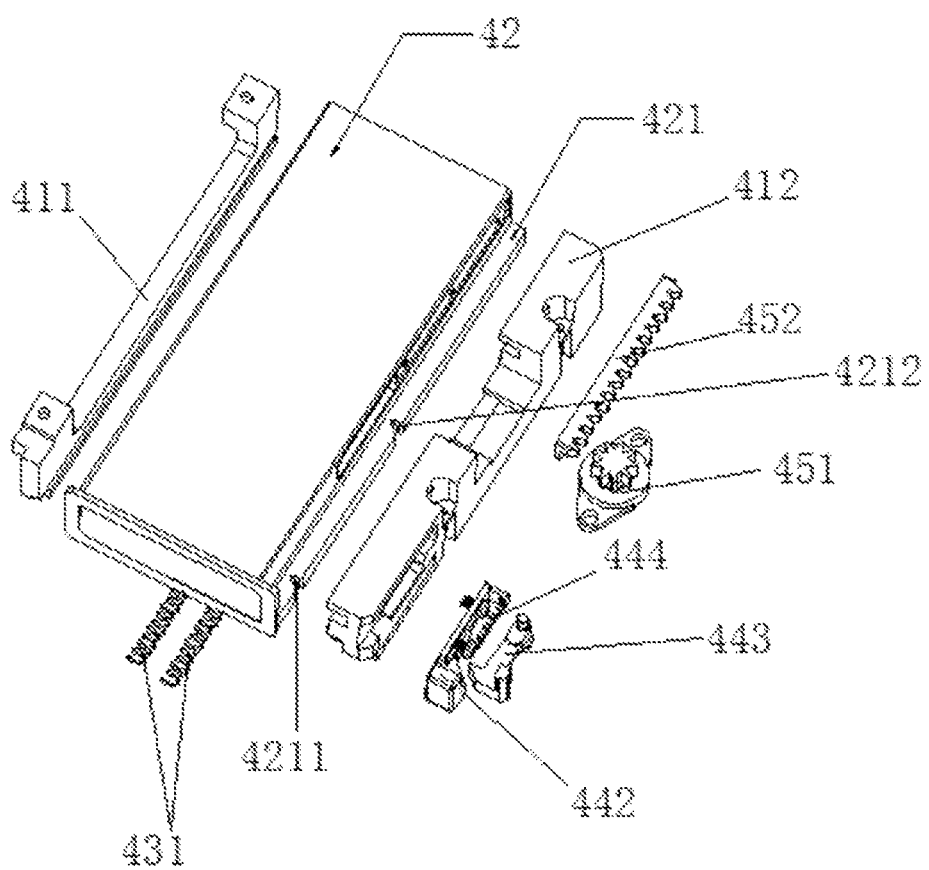
FIG. 7 is an exploded structural diagram of the popup box of the notebook computer according to the present invention.

As shown in FIGS. 1-7, the present invention discloses a notebook computer, including a computer main body 1 and a screen 2 movably connected to the computer main body 1. An expansion card press mechanism is provided inside the computer main body 1. The computer main body is further provided therein with a cavity. A popup box 42 is further provided on one side of the computer main body. The expansion card press mechanism includes press blocks capable of moving forward and backward in an installation direction of an expansion card. The press blocks press the expansion card. The cavity is provided with an opening which is disposed at a position one an end face of the computer main body. The popup box is movably connected to the computer main body and provided with an antenna.

The expansion card press mechanism includes press blocks 31 and a support plate 32. The press blocks 31 are mounted on the support plate 32, and press the expansion card 34 in the installation direction of the expansion card 34. The press blocks 31 are capable of moving forward and backward in the installation direction of the expansion card 34.

Two slide grooves 311 are provided at joints of the press blocks 31 and the support plate 32. The slide grooves 311 are strip-shaped. Two threaded holes are provided at positions on the support plate 32 corresponding to the positions of the two slide grooves 311. Fastening bolts 36 pass through the slide grooves 311 and are then inserted into the threaded holes for fastening. As the slide grooves are strip-shaped, the press blocks 31 may move forward and back on the support plate 32 by using the fastening bolts 36 as guides when the fastening bolts 36 are not fastened.

During installation of the expansion card 34, the fastening bolts 36 are loosened at first, and the press blocks 31 are placed at an end away farthest from the installation direction of the expansion card 34. Subsequently, the expansion card 34 is mounted inside a card base, then the press blocks 31 are moved so as to allow the press blocks to press the expansion card 34, and finally the fastening bolts 36 are fastened. Thus, the expansion card 34 is secured by the press blocks 31, and will not get loose or even fall off due to the vibration of the computer, thereby ensuring the working state of the computer.

The expansion card press mechanism further includes cushion blocks 33 which are mounted on the press block 31. The press blocks press the expansion card 34 through the cushion blocks 33. The cushion blocks 33 are rubber cushion blocks with a function of buffering, so that the expansion card 34 will be not crushed due to the violent vibration of the computer. Furthermore, a plurality of grooves 331 for limiting is provided on the expansion card 34. The grooves 331 are buckled on the expansion card 34 for avoiding jitter. The grooves 331 are a plurality of grooves capable of pressing expansion cards 34 of different height.

The support plate 32 is of a step structure with at least two steps. The surface of each step is provided with a press block 31. Because the requirements for computer performance are increasing at present, there are more and more expansion cards in a computer. Therefore, it is required to fix a plurality of expansion cards. The support plate 32 of a step structure may press expansion cards of different height, so it is not required to reinstall a support plate 32 according to the expansion cards of different height, thereby saving the installation space and the workload.

The support plate 32 is further provided with a fixation mechanism connected to a computer fixation plate 35. In this embodiment, the fixation mechanism is as follows: bolt holes 38 are provided on the support plate 32, threaded fixation holes corresponding to the bolt holes 38 are provided on the computer fixation plate 35, and the support plate 32 is fixed on the computer fixation plate 35 by fixation bolts 37.

The press blocks 31 may be tightly pressed in the installation direction of the expansion card, so that the phenomenon of loosening or falling-off of the expansion card will not occur during the movement or transportation of a computer, and the normal use of the computer will be not affected.

The computer main body 1 is further provided with a popup device. The popup box 42 is movably connected to the computer main body 1. The computer main body 1 is capable of popping up the popup box 42 via the popup device. The popup box 42 is provided with an antenna.

The popup box 42 is mounted inside the computer main body 1. The computer main body 1 is further provided with a slide mechanism including a first slide groove 411 and a second slide groove. The popup box 42 is provided with a first slider and a second slider 421. The first slider is mounted inside the first slide groove, and the second slider 421 is mounted inside the second slide groove 412, so that the popup box 42 may do reciprocating slide inside the computer main body 1. As the popup box 42 is provided with an antenna, the antenna may be popped up, thereby enhancing signals received and transmitted by the antenna.

The popup device includes a popup mechanism and a switch engagement mechanism for controlling the popup mechanism to work. The popup mechanism includes a first spring 431 which is mounted at the lower part of the popup box 42. One end of the first spring 431 is mounted inside the computer main body 1, while the other end thereof is fixed mounted on the popup box 42. When the popup box 42 is closed, the first spring 431 is in a compressed state. When switch engagement mechanism controls the popup mechanism to pop the popup box up 42, the first spring will be popped up by the popup box 42.

The switch engagement mechanism includes a second spring 444, a buckle 443, a start key 442 and necks. The start key 442 is mounted on the second slide groove 412 and used for controlling the opening or closing of the buckle 443.

The second spring 444 is disposed between the start key 442 and the second slide groove 412. When the start key 442 is pressed down, the start key 442 may be popped up to restore to the original state, which is convenient for the next time of working.

The buckle 443 is mounted on the second slide groove 412 and is capable of rotating. A third spring for pulling the buckle 443 to fit with the start key 442 is provided between the buckle 443 and the second slide groove 412.

The necks are provided on the second slide groove 421 of the popup box 42 and include a first neck 4211 and a second neck 4212. When the popup box 42 is closed and the start key 442 is not pressed down, the buckle 443 is buckled into the first neck 4211. When the start key 443 is pressed down, the buckle 443 is separated from the first neck 4211, and the popup box 42 pops up. After the start key 443 is pressed down, the start key 443 is allowed to recover to the original state due to the action of the second spring 444. At this time, the buckle 443 is allowed to engage with the start key due to the action of the third spring and buckled into the second neck 4212, and the popup box 42 stops popping up.

The computer main body 1 is further provided with a damper 451 and a rack 452. The damper 451 is mounted on the second slide groove 412. A gear is provided at the upper end of the damper 451. The rack 452 is mounted on the popup box 42 and engaged with the gear. When the popup box 42 pops up, the damper 452 will slow down the popup speed, thereby protecting the popup box 42 and keeping components away from damage due to too rapid popup speed.

During the operation of the notebook computer, the popup box with an antenna pops up, so signals received and transmitted of the antenna are enhanced, and problems such as weak signal will not occur because of the air-tightness of the computer itself. Furthermore, the popup of the popup box is more convenient for operation. The popup box is closed when it is not required to work, so it is convenient to carry and the air-tightness of the computer is also ensured.

A mianboard 54 and an interface 541, connected to the mainboard 54, are provided inside the computer main body. The interface is located inside the cavity 53.

Newly added hardware is inserted into the cavity 53 through the opening, and the hardware is connected to the interface 541, so that corresponding functions of the hardware may be realized, and it is convenient for users to use.

The notebook computer further includes a cover fitted with the opening of the cavity 53. Through the cover, dust or other impurities are prevented from entering the cavity 53.

A hard disk 521 and a battery 522 are further provided inside the computer main body 1.

A spindle 518 is provided on the bottom of the screen 2, and used for connecting to the computer main body 1 to allow the screen to rotate.

The foregoing shows further detailed description of the present invention in conjunction with specific preferred embodiments, and will not be regarded as any limitations to the specific embodiments of the present invention. A person of ordinary skill in the art may make various simple deductions or replacements without departing from the idea of the present invention. However, these deductions or replacements shall fall into the protection scope of the present invention.

What is claimed is:

1. A notebook computer, comprising a computer main body and a screen movably connected to the computer main body, an expansion card press mechanism and a cavity being provided inside the computer main body, a popup box being further provided on one side of the computer main body, the expansion card press mechanism comprising press blocks capable of moving forward and backward in an installation direction of an expansion card, the press blocks being pressed on the expansion card, the cavity being provided with an opening which is disposed at a position on an end face of the computer main body, the popup box being movably connected to the computer main body and provided with an antenna.

2. The notebook computer according to claim 1, wherein the expansion card press mechanism further comprises a support plate which is mounted on the computer main body, the press blocks being mounted on the support plate and being capable of moving on the support plate, the support plate being provided with a fixation mechanism connected to a computer fixation plate.

3. The notebook computer according to claim 2, wherein strip-shaped slide grooves are provided on the press blocks, threaded holes being provided on the support plate, the slide grooves being corresponding to the positions of the threaded holes, fastening bolts passing through the slide grooves and then being fixed inside the threaded holes.

4. The notebook computer according to claim 3, wherein the press blocks are provided with cushion blocks pressing the expansion card in the installation direction of the expansion card, the support plate being of a step structure having at least two steps, the surface of each step being provided with a press block.

5. The notebook computer according to claim 1, wherein the computer main body is further provided with a popup device and a slide mechanism, the popup device being capable of sliding inside the slide mechanism, the slide mechanism comprising a first slide groove and a second slide groove, the popup box being provided with a first slider and a second slider, the first slider being mounted inside the first slide groove, the second slider being mounted inside the second slide groove, the popup device comprising a popup mechanism and a switch engagement mechanism in cooperation with the popup mechanism, the switch engagement mechanism controlling the popup mechanism to pop the popup box up.

6. The notebook computer according to claim 5, wherein the popup mechanism comprises a first spring, one end of which is mounted at a lower end of the popup box while the other end thereof is mounted inside the computer main body, the spring being in a compressed state when the popup box is closed.

7. The notebook computer according to claim 6, wherein the switch engagement mechanism comprises a second spring, a buckle, a start key and a neck, the start key being mounted on the second slide groove, the second spring being mounted between the start key and the second slide groove, the start key being capable of compressing the second spring and capable of being bounced by the second spring, the neck being disposed on the second slider, the buckle being buckled inside the neck, the buckle being separate from the neck to pop the popup box up when the start key is pressed down.

8. The notebook computer according to claim 7, wherein the neck comprises a first neck and a second neck, the buckle being buckled in the first neck when the popup box is closed, the buckle being buckled in the second neck when the popup box is opened.

9. The notebook computer according to claim 8, wherein the computer main body is further provided with a damper and a rack, the damper being mounted on the second slide groove, the rack being mounted on the popup box, the damper being provided with a gear in cooperation with the rack.

10. The notebook computer according to claim 1, wherein the cavity is provided therein with a terminal interface connected to the mainboard, and the notebook computer further comprises a cover fitted with the opening of the cavity.

11. The notebook computer according to claim 4, wherein the computer main body is further provided with a popup device and a slide mechanism, the popup device being capable of sliding inside the slide mechanism, the slide mechanism comprising a first slide groove and a second slide groove, the popup box being provided with a first slider and a second slider, the first slider being mounted inside the first slide groove, the second slider being mounted inside the second slide groove, the popup device comprising a popup mechanism and a switch engagement mechanism in cooperation with the popup mechanism, the switch engagement mechanism controlling the popup mechanism to pop the popup box up.

12. The notebook computer according to claim 11, wherein the popup mechanism comprises a first spring, one end of which is mounted at a lower end of the popup box while the other end thereof is mounted inside the computer main body, the spring being in a compressed state when the popup box is closed.

13. The notebook computer according to claim 12, wherein the switch engagement mechanism comprises a second spring, a buckle, a start key and a neck, the start key being mounted on the second slide groove, the second spring being mounted between the start key and the second slide groove, the start key being capable of compressing the second spring and capable of being bounced by the second spring, the neck being disposed on the second slider, the buckle being buckled inside the neck, the buckle being separate from the neck to pop the popup box up when the start key is pressed down.

14. The notebook computer according to claim 13, wherein the neck comprises a first neck and a second neck, the buckle being buckled in the first neck when the popup box is closed, the buckle being buckled in the second neck when the popup box is opened.

15. The notebook computer according to claim 14, wherein the computer main body is further provided with a damper and a rack, the damper being mounted on the second slide groove, the rack being mounted on the popup box, the damper being provided with a gear in cooperation with the rack.

16. The notebook computer according to claim 15, wherein the cavity is provided therein with a terminal interface connected to the mainboard, and the notebook computer further comprises a cover fitted with the opening of the cavity.

17. The notebook computer according to claim 9, wherein the cavity is provided therein with a terminal interface connected to the mainboard, and the notebook computer further comprises a cover fitted with the opening of the cavity.

* * * * *